US012190102B2

(12) United States Patent
Chen

(10) Patent No.: US 12,190,102 B2
(45) Date of Patent: Jan. 7, 2025

(54) DATA STORAGE DEVICE AND METHOD CAPABLE OF QUICKLY UPDATING OPERATING SYSTEM

(71) Applicant: INNODISK CORPORATION, New Taipei (TW)

(72) Inventor: Yu-Yang Chen, New Taipei (TW)

(73) Assignee: INNODISK CORPORATION, New Taipei (TW)

( * ) Notice: Subject to any disclaimer, the term of this patent is extended or adjusted under 35 U.S.C. 154(b) by 446 days.

(21) Appl. No.: 17/648,226

(22) Filed: Jan. 18, 2022

(65) Prior Publication Data

US 2023/0153107 A1 May 18, 2023

(30) Foreign Application Priority Data

Nov. 12, 2021 (TW) ................................ 110142317

(51) Int. Cl.
*G06F 8/658* (2018.01)
*G06F 8/65* (2018.01)
*G06F 9/4401* (2018.01)

(52) U.S. Cl.
CPC ................ *G06F 8/658* (2018.02); *G06F 8/65* (2013.01); *G06F 9/4408* (2013.01)

(58) Field of Classification Search
CPC .......... G06F 8/658; G06F 8/65; G06F 9/4408
USPC ...................................................... 717/169
See application file for complete search history.

(56) References Cited

U.S. PATENT DOCUMENTS

| | | | | |
|---|---|---|---|---|
| 2005/0278715 A1* | 12/2005 | Herle et al. | ............. | G06F 8/658 717/162 |
| 2010/0180108 A1* | 7/2010 | Liu | ...................... | G06F 11/1433 717/168 |
| 2011/0173601 A1* | 7/2011 | de los Reyes | .......... | G06F 8/658 717/169 |

FOREIGN PATENT DOCUMENTS

| | | |
|---|---|---|
| TW | 201621647 A | 6/2016 |
| TW | 202105217 A | 2/2021 |

* cited by examiner

*Primary Examiner* — Wei Y Zhen
*Assistant Examiner* — Mohammed N Huda

(57) ABSTRACT

A data storage device includes a controller, a data storage unit, a microprocessor, and a network communication unit. The controller includes a firmware. The data storage unit includes a first system storage sector and a second system storage sector. The first system storage sector stores an original operating system, and the second system storage sector stores a backup operating system. When the data storage device receives an operating system differential file from a cloud management platform, the firmware updates the backup operating system in the second system storage sector to obtain a new version of backup operating system. Accordingly, the backup operating system of the data storage device can be quickly updated by downloading a small file size of the operating system differential file so as to enhance the convenience for the updating of the backup operating system.

12 Claims, 6 Drawing Sheets

DATA STORAGE DEVICE AND METHOD CAPABLE OF QUICKLY UPDATING OPERATING SYSTEM

This non-provisional application claims priority claim under 35 U.S.C. § 119(a) on Taiwan Patent Application No. 110142317 filed Nov. 12, 2021, the entire contents of which are incorporated herein by reference.

FIELD OF THE INVENTION

The present invention relates to a method for quickly updating an operating system of a data storage device.

BACKGROUND

When a computer is used, an operating system is often damaged due to improper operation, getting a virus or power failure. A data storage sector inside the computer is divided into an operating system sector and a system recovery sector before the computer is shipped. The operating system sector stores an operating system, and the system recovery sector stores a backup operating system, for example, system recovery file. When the user wants to execute the operating system recovery procedure, he can press a recovery button connected to a motherboard to trigger an operating system recovery function. After the operating system recovery function is triggered, a BIOS or a miniaturized system of the computer can perform a recovery procedure for the operating system in the operating system sector by the backup operating system of the system recovery sector.

In the past, if the backup operating system is to be updated, the computer will download a completely new backup operating system from a cloud server of system provider, and cover the original backup operating system by the completely new backup operating system. However, the file capacity of the completely new backup operating system is often very large that it takes a long time to download the files, which will very inconvenient for the updating of the backup operating system.

SUMMARY

It is one objective of the present invention to provide a data storage device, which comprises a controller, a data storage unit, a microprocessor, and a network communication unit. The controller comprises a firmware. The microprocessor comprises an embedded system. The data storage unit comprises a first system storage sector and a second system storage sector. The first system storage sector stores an original operating system, and the second system storage sector stores a first backup operating system. When the data storage device wants to update the first backup operating system, the embedded system downloads an operating system differential file from a cloud management platform via the network communication unit. The controller updates the first backup operating system in the second system storage sector by the use of the operating system differential file so as to obtain a new version of first backup operating system. Accordingly, the backup operating system can be updated quickly by downloading a small file size of the operating system differential file so as to enhance the convenience for the updating of the backup operating system.

It is another objective of the present invention to provide a data storage device, in which the firmware of the controller presets a boot pointer to point to a first initial sector address of the first system storage sector, and sets the first initial sector address as a master boot sector address. When the original operating system is operating normally, the controller reads a master boot record from the first initial sector address, and uses the master boot record in the first initial sector address to execute a boot operation of the original operating system. When the original operating system is abnormal, the controller will execute a boot pointer offset procedure to offset the boot pointer from pointing to the first initial sector address of the first system storage sector to pointing to the second initial sector address of the second system storage sector, read a master boot record from the second initial sector address, and use the master boot record in the second initial sector address to execute a boot operation of the new version of first backup operating system. Thus, when the original operating system is abnormal, the boot pointer will be offset from pointing to the first initial sector address of the first system storage sector to pointing to the second initial sector address of the second system storage sector, such that the operation of the electronic apparatus can be restored quickly via the new version of first backup operating system.

It is another objective of the present invention to provide a data storage device, in which the firmware of the controller defines an operating system update procedure. The data storage unit further comprises a third system storage sector. The third system storage sector stores a second backup operating system. The controller updates the second backup operating system in the third system storage sector by the use of the operating system differential file so as to obtain a new version of second backup operating system. During the new version of first backup operating system is operating, the controller executes the operating system update procedure to update the original operating system in the first system storage sector by adopting the new version of second backup operating system of the third system storage sector. After the original operating system in the first system storage sector has updated, the controller further offsets the boot pointer from pointing to the second initial sector address back to pointing to the first initial sector address. Then, the electronic apparatus performs the boot operation of the updated original operating system, and executes the operations in the operating environment of the updated original operating system.

To achieve the above objective, the present invention provides a data storage device, comprising: a controller; a data storage unit, connected to the controller and comprising a first system storage sector, a second system storage sector, and a third system storage sector; wherein the first system storage sector stores an original operating system, the second system storage sector stores a first backup operating system, and the third system storage sector stores a second backup operating system; a microprocessor, connected to the controller; and a network communication unit, connected to the microprocessor, wherein the data storage device is network connected to a cloud management platform via the network communication unit; wherein when the data storage device downloads an operating system differential file from the cloud management platform via the network communication unit, the microprocessor requires the controller updates the first backup operating system in the second system storage sector and the second backup operating system in the third system storage sector by using the operating system differential file, so as to obtain a new version of first backup operating system and a new version of second backup operating system.

In one embodiment of the present invention, wherein the operating system differential file is generated by using a computer apparatus to perform a comparison of data difference between a new version of operating system and the original operating system, and to store the operating system differential file into a data storage space of the cloud management platform.

In one embodiment of the present invention, wherein the controller comprises a firmware, the firmware defines an original operating system update procedure; when the original operating system is abnormal or required to be updated, the controller executes the original operating system update procedure to update the original operating system in the first system storage sector by the new version of first backup operating system in the second system storage sector, so as to obtain an updated original operating system.

In one embodiment of the present invention, wherein the first system storage sector comprises a first initial sector address, and the second system storage sector comprises a second initial sector address; wherein the controller comprises a firmware, and the firmware defines a boot pointer offset procedure; a boot pointer is preset by the firmware to point to the first initial sector address of the first system storage sector; when the original operating system is abnormal or required to be updated, the controller executes the boot pointer offset procedure to offset the boot pointer from pointing to the first initial sector address of the first system storage sector to pointing to the second initial sector address of the second system storage sector, so as to execute a boot operation by the new version of first backup operating system.

In one embodiment of the present invention, wherein a state of the first system storage sector is preset as a displayed state by the firmware, and a state of the second system storage sector is preset as a hidden state by the firmware; when the boot pointer is offset to point to the second initial sector address of the second system storage sector, the firmware converts the state of the first system storage sector from the displayed state to the hidden state, and converts the state of the second system storage sector from the hidden state to the displayed state.

In one embodiment of the present invention, wherein the firmware defines an original operating system update procedure; during the new version of first backup operating system is operating, the controller executes the original operating system update procedure to update the original operating system in the first system storage sector by the new version of second backup operating system in the third system storage sector.

In one embodiment of the present invention, wherein the network communication unit is a WiFi communication interface, an Ethernet communication interface, a 3G, 4G or 5G communication interface, or a communication interface capable of connecting Internet.

In one embodiment of the present invention, wherein the microprocessor comprises an embedded system, and the cloud management platform monitors or manages an update operation of operating system via the embedded system.

The present invention further comprises a method capable of quickly updating operating system, comprising: providing a data storage unit comprising a first system storage sector and a second system storage sector; wherein the first system storage sector stores an original operating system, the second system storage sector stores a first backup operating system; downloading an operating system differential file from a cloud management platform via a network communication unit; and updating the first backup operating system in the second system storage sector by the operating system differential file to obtain a new version of first backup operating system.

In one embodiment of the present invention, wherein the first system storage sector comprises a first initial sector address, the second system storage sector comprises a second initial sector address, the method further comprises: defining a boot pointer offset procedure; presetting a boot pointer to point to the first initial sector address of the first system storage sector; executing the boot pointer offset procedure when the original operating system is abnormal to offset the boot pointer from pointing to the first initial sector address of the first system storage sector to pointing to the second initial sector address of the second system storage sector; and executing a boot operation by the new version of first backup operating system in the second system storage sector.

In one embodiment of the present invention, further comprising: presetting a state of the first system storage sector as a displayed state and presetting a state of the second system storage sector as a hidden state; and converting the state of the first system storage sector from the displayed state to the hidden state and converting the state of the second system storage sector from the hidden state to the displayed state when the boot pointer is offset to point to the second initial sector address of the second system storage sector.

In one embodiment of the present invention, providing a third system storage sector within the data storage unit; wherein the third system storage sector stores a second backup operating system; updating the second backup operating system in the third system storage sector by the operating system differential file, so as to obtain a new version of second backup operating system; defining an original operating system update procedure; when the new version of first backup operating system is booted and operating, executing steps of: updating the original operating system in the first system storage sector by the new version of second backup operating system in the third system storage sector; executing the boot pointer offset procedure to offset the boot pointer from pointing to the second initial sector address of the second system storage sector back to pointing to the first initial sector address of the first system storage sector after the original operating system in the first system storage sector has updated; and executing the boot operation again by the updated original operating system in the second system storage sector.

DETAILED DESCRIPTION OF THE PREFERRED EMBODIMENTS

Figure 1:
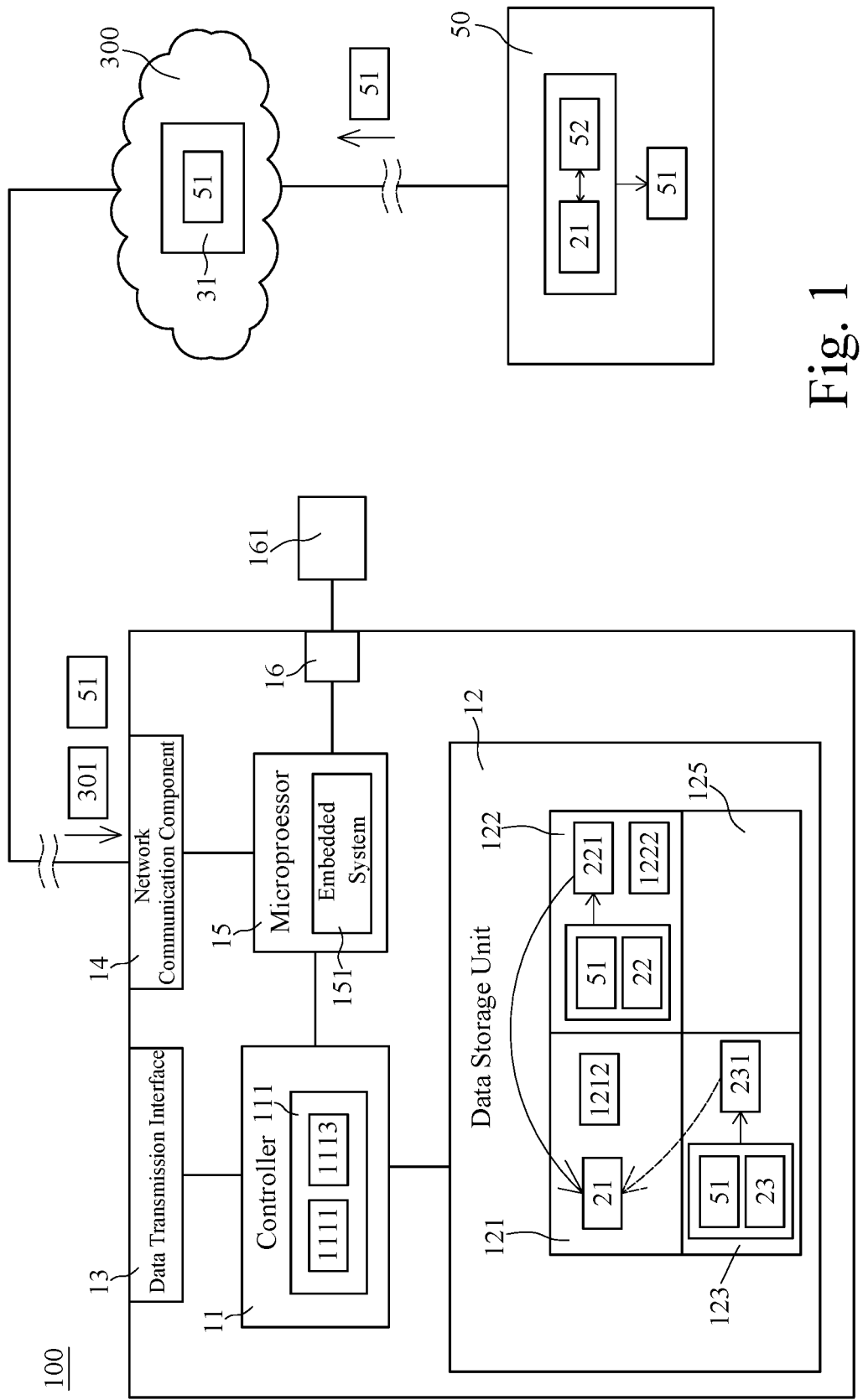
FIG. 1 is a structural view of a data storage device of the present invention.
Figure 2:
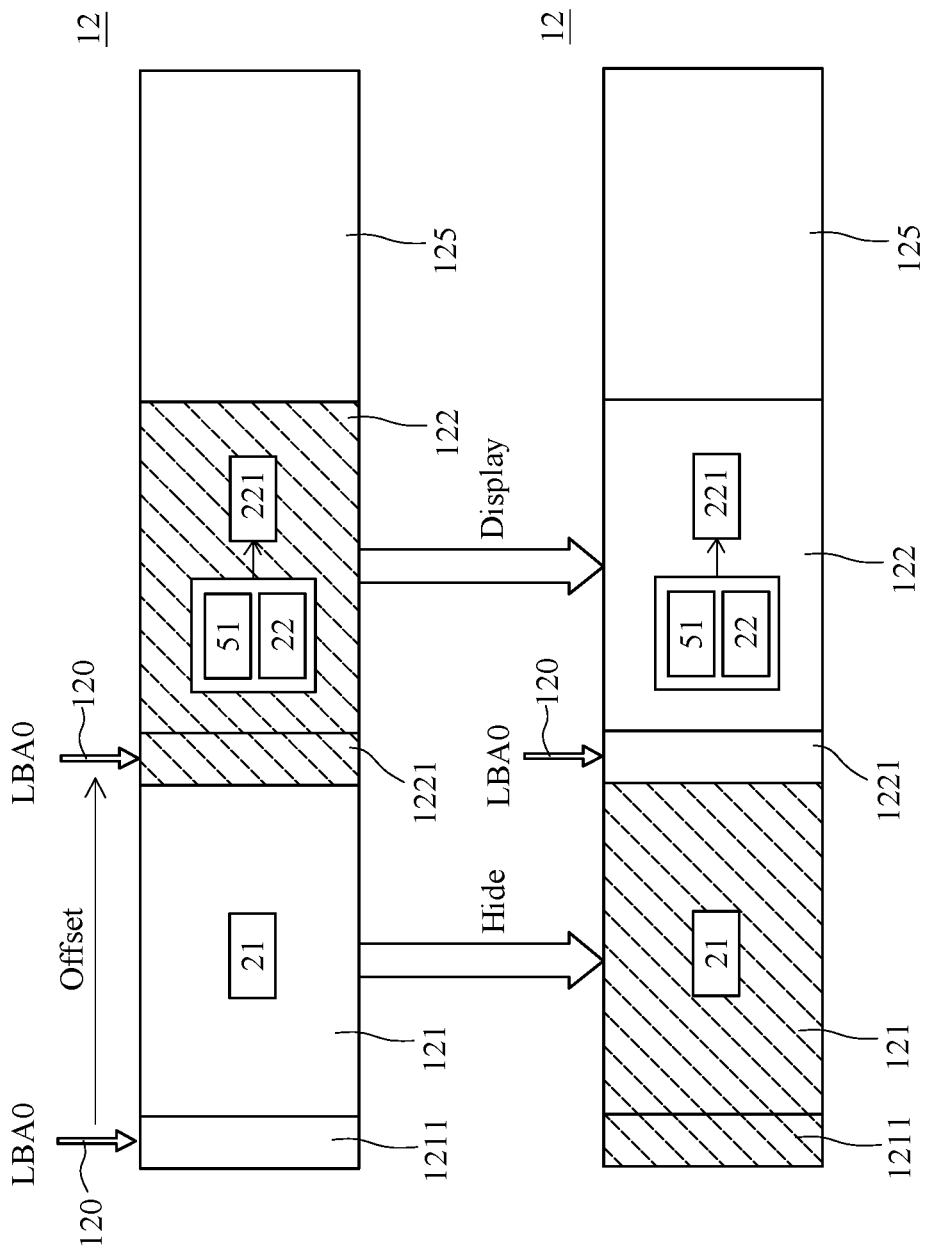
FIG. 2 is a schematic diagram of a data sector of a data storage unit of the data storage device according to one embodiment of the present invention.

Referring to FIG. 1 and FIG. 2, there are shown a structural view of a data storage device of the present invention, and a schematic diagram of data sector of a data storage unit of the data storage device according to one embodiment of the present invention. As shown in FIG. 1, the data storage device 100 of the present invention may be a SSD (Solid State Disk), which is disposed in an electronic apparatus (such as a computer or an automation apparatus), and as a storage medium of the electronic apparatus. The data storage device 100 comprises a controller 11, a data storage unit 12, a data transmission interface 13, a network communication unit 14, and a microprocessor 15. The controller 11 is connected to the data storage unit 12 and the data transmission interface 13. The microprocessor 15 is connected the controller 11 and the network communication unit 14. The data transmission is proceeding between the data storage device 100 and the electronic apparatus via the data transmission interface 13. The network communication unit 14 is a WiFi communication interface, an Ethernet communication interface, a 3G, 4G or 5G communication interface, or a communication interface capable of connecting network.

The controller 11 comprises a firmware 111. The data storage unit 12 comprises a plurality of flash memories, which are formed with a plurality of data sectors. As shown in FIG. 2, the data sectors of the data storage unit 12 are divided by the controller 11 into a first system storage sector 121, a second system storage sector 122, and a data storage sector 125. A state of the first system storage sector 121 and a state of the data storage sector 125 are preset as a displayed state by the firmware 111, respectively. A state of the second system storage sector 122 is preset as a hidden state by the firmware 111. In the present invention, the sector in the hidden state is a physical storage space that is unable to be viewed by the operating system or BIOS via the logical block address. For example, the second system storage sector 122 is an over provisioning (OP) sector reserved by SSD manufacturer.

The first system storage sector 121 stores an original operating system 21, and comprises a first initial sector address 1211. The second system storage sector 122 stores a first backup operating system 22, and comprises a second initial sector address 1221. The data sector of the first initial sector address 1211 has a master boot record (MBR) 1212, and the data sector of the second initial sector address 1221 has the other master boot record (MBR) 1222. The first backup operating system 22 has the same data contents as the original operating system 21.

The data storage device 100 of the present invention is network connected to a cloud management platform 300 via the network communication unit 14. A data storage space 31 stores an operating system difference file 51. The operating system difference file 51 is provided by a computer apparatus 50. The computer apparatus 50 can be a server computer disposed in the cloud management platform 300; otherwise, the computer apparatus 50 is disposed outside the cloud management platform 300, and connected to the cloud management platform 300 in network. The computer apparatus 50 stores the original operating system 21 and a new version of operating system 52 which are provided by operating system developer. The computer apparatus 50 performs a comparison of data difference between the original operating system 21 and a new version of operating system 52 via a data comparison algorithm, and therefore generates the operating system differential file 51, and then stores the operating system differential file 51 into a data storage space 31 of the cloud management platform 300.

The microprocessor 15 is an independent chip, or the microprocessor 15 can be integrated in the controller 11. The microprocessor 15 comprises an embedded system 151. The cloud management platform 300 monitors or manages an update operation of operating system via the embedded system 151. When the data storage device 100 wants to update the backup operating system, the embedded system 151 downloads the operating system differential file 51 from the data storage space 31 of the cloud management platform 300 via the network communication unit 14. The controller 11 updates the first backup operating system 22 in the second system storage sector 122 by the operating system differential file 51 so as to obtain a new version of first backup operating system 221. In comparison with the conventional technology which needs to download a large file size of a complete new version of operating system during the updating procedure of the backup operating system of the data storage device, the data storage device 100 of the present invention only needs to download a small file size of the operating system differential file 51 such that the backup operating system can be updated quickly to enhance the convenience for the updating of the backup operating system.

A boot pointer 120 is preset by the firmware 111 of the controller 11 to point to the first initial sector address 1211 of the first system storage sector 121, and the first initial sector address 1211 is set by the firmware 111 of the controller 11 as a master boot sector address, for example, the zeroth logical block addressing (logical block addressing 0, LBA 0). When the electronic apparatus is power on, firstly, according to the indication of the boot pointer 120, the controller 11 enters the first system storage sector 121 of the data storage unit 12, reads the master boot record 1212 from the first initial sector address 1211 of the first system storage sector 121, and uses the master boot record 1212 to execute a boot operation of the original operating system 21. After the original operating system 21 has booted normally, the electronic apparatus will perform the operations in the operating environment of the original operating system 21.

Furthermore, the firmware 111 defines a boot pointer offset procedure 1111. When the original operating system 21 is abnormal or required to be updated, the controller 11 will execute the boot pointer offset procedure 1111 to offset the boot pointer 120 from pointing to the first initial sector address 1211 of the first system storage sector 121 to pointing to the second initial sector address 1222 of the second system storage sector 122, and sets the second initial sector address 1222 as the master boot sector address. Then, the controller 11 converts the state of the first system storage sector 121 from the displayed state to the hidden state, converts the state of the second system storage sector 122 from the hidden state to the displayed state, reads the master boot record 1222 from the second initial sector address 1221 of the second system storage sector 122, and uses the master boot record 1222 to execute the boot operation of the new version of first backup operating system 221. After the new version of first backup operating system 221 is normally booted, the electronic apparatus will perform the operations in the operating environment of the new version of first backup operating system 221. Accordingly, when the original operating system 21 is abnormal or required to be updated, the boot pointer 120 will be offset by the firmware 111 to the second initial sector address 1221 of the second system storage sector 122, such that the boot operation of the electronic apparatus can be quickly restored by adopting the new version of first backup operating system 221 in the second system storage sector 122.

Figure 3:
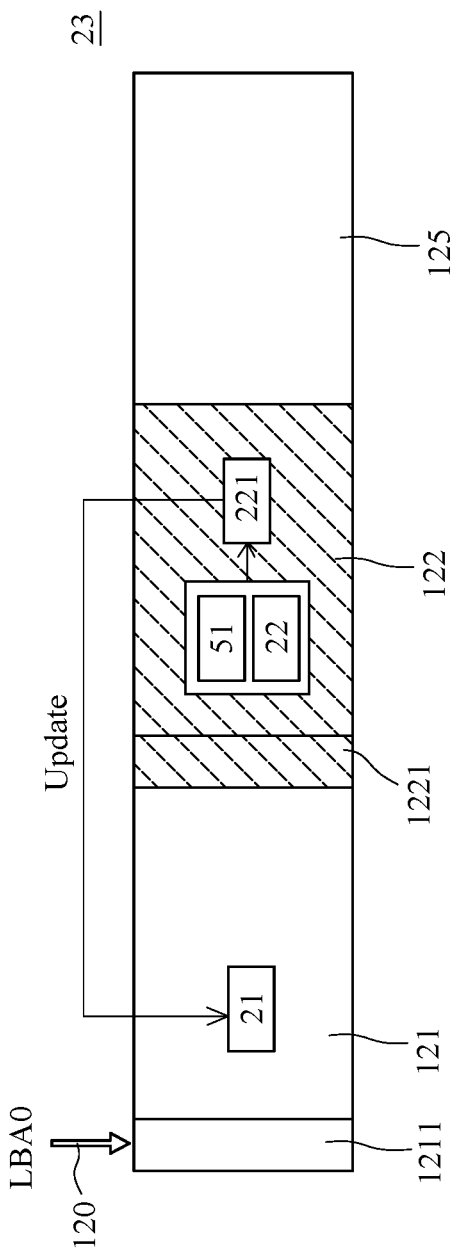
FIG. 3 is a schematic diagram of the data sector of the data storage unit of the data storage device according to another embodiment of the present invention.

Referring to FIG. 3, there is a schematic diagram of data sector of the data storage unit of the data storage device according to another embodiment of the present invention, with simultaneously reference to FIG. 1. As shown in FIG. 1 and FIG. 3, in the present embodiment, the firmware 111 of the controller 11 defines an original operating system update procedure 1113. When the original operating system 21 is abnormal or required to be updated, the firmware 11 will execute the original operating system update procedure 1113 to update the original operating system 21 in the first system storage sector 121 by the new version of first backup operating system 221 in the second system storage sector 122. After the original operating system 21 has updated, the controller 11 again executes the boot operation by the updated original operating system 21, and further the electronic apparatus executes the operations in the operating environment of the updated original operating system 21.

Figure 4:
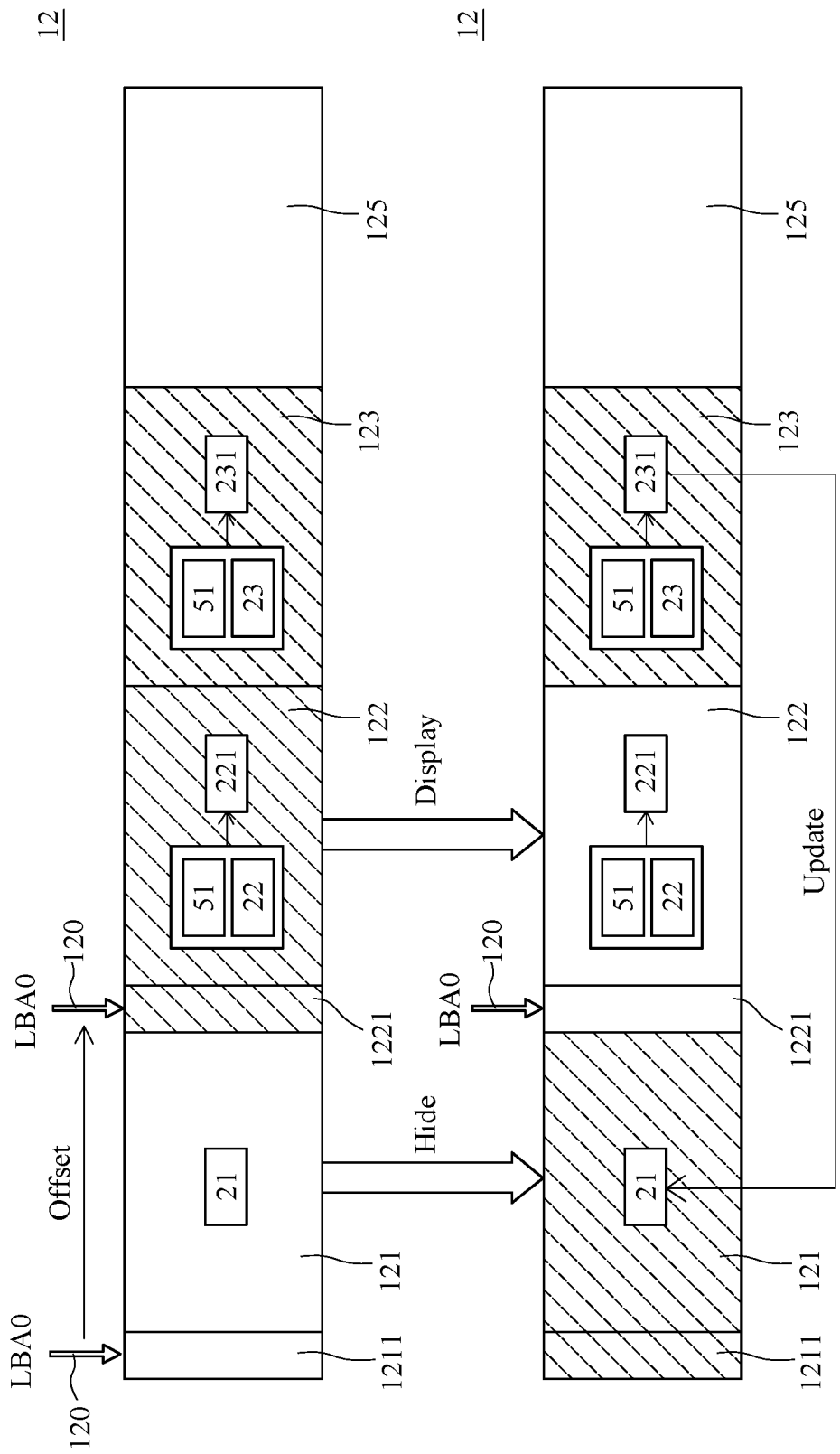
FIG. 4 is a schematic diagram of the data sector of the data storage unit of the data storage device according to another embodiment of the present invention.

Referring to FIG. 4, there is a schematic diagram of data sector of the data storage unit of the data storage device according to another embodiment of the present invention, with simultaneously reference to FIG. 1. As shown in FIG. 1 and FIG. 4, a third system storage sector 123 is further divided from the data sectors of the data storage unit 12. Similar to the second system storage sector 122, the state of the third system storage sector 123 is also preset as a hidden state by the firmware 111. The third system storage sector 123 is another over provisioning sector of the data storage unit 12, and unable to be accessed by the logical block address. The third system storage sector 123 stores a second operating system 23. The second backup operating system 23 has the same data contents as the original operating system 21 and the first backup operating system 22.

When the backup operating systems 22 and 23 need to be updated, the embedded system 151 downloads the operating system differential file 51 from the cloud management platform 300 via the network communication unit 14, and then the controller 11 updates the backup operating systems 22 and 23 by the operating system differential file 51, so as to obtain the new version of backup operating systems 221 and 231, respectively.

In one embodiment of the present invention, the updating of the backup operating systems 22 and 23 of the data storage device 100 can be executed according to a means of remote controlling. The cloud management platform 300 sends a notification 301 for indicating that the backup operating system needs to be updated to the data storage device 100. After receiving the notification 301, the embedded system 15 of the data storage device 100 downloads the operating system differential file 51 from the cloud management platform 300 via the network communication unit 14, and requires that the firmware 111 updates the backup operating systems 22 and 23 by the operating system differential file 51.

In another embodiment of the present invention, the updating of the backup operating systems 22 and 23 of the data storage device 100 can be executed according to a means of hardware triggering. The data storage device 100 further comprises an input and output port (such as general purpose input/output, GPIO) 16. The input and output port 16 is connected at one end thereof to the microprocessor 15 or the controller 11, and connected at other end thereof to a trigger key 161. When the user wants to update the backup operating systems 22 and 23, he can press the trigger key 161 to trigger the input and output port 16. When the embedded system 151 knows that the input and output port 16 has triggered, it downloads the operating system differential file 51 from the cloud management platform 300 via the network communication unit 14, and requires that the firmware 111 updates the backup operating systems 22 and 23 by the operating system differential file 51.

Sequentially, in the present embodiment, the firmware 111 of the controller 11 defines the boot pointer offset procedure 1111 and the original operating system update procedure 1113. When the original operating system 21 damaged and cannot boot smoothly, firstly, the controller 11 will execute the boot pointer offset procedure 1111 to offset the boot pointer 120 from pointing to the first initial sector address 1211 of the first system storage sector 121 to pointing to the second initial sector address 1221 of the second system storage sector 122. After the boot pointer 120 is offset to pointing to the second initial sector address 1221 of the second system storage sector 122, the controller 11 converts the state of the first system storage sector 121 from the displayed state to the hidden state, and converts the second system storage sector 122 from the hidden state to the displayed state. Then, the controller 11 reads the master boot record 1222 from the second initial sector address 1221 of the second system storage sector 122, and uses the master boot record 1222 to execute the boot operation of the new version of first backup operating system 221. When the new version of first backup operating system 221 has booted and is operating, the controller 11 further executes the original operating system update procedure 1113 so as to update the original operating system 21 of the first system storage sector 121 by adopting the new version of second backup operating system 231 of the third system storage sector 123. When the original operating system 21 has updated, the controller 11 converts the state of the first system storage sector 121 from the hidden state to the displayed state, converts the second system storage sector 122 from the displayed state to the hidden state, and then executes the boot operation by the updated original operating system 21 of the first system storage sector 121 such that the electronic apparatus executes the operations in the operating environment of the updated original operating system 21.

In one embodiment of the present invention, taking a means of system monitoring controls that the controller 11 executes the boot pointer offset procedure 1111 and/or the original operating system update procedure 1113. When the embedded system 151 monitors that the original operating system 21 is abnormal, or receives a message, from the cloud management platform 300, which indicates that the original operating system 21 of the data storage device 100 needs to be updated, the embedded system 151 requires that the firmware 111 executes the boot pointer offset procedure 1111 and/or the original operating system update procedure 1113. In other embodiment of the present invention, taking a means of hardware triggering controls that the controller 11 executes the boot pointer offset procedure 1111 and/or the original operating system update procedure 1113. When the user of the data storage device 100 knows that the original operating system 21 is abnormal or the user of the data storage device 100 desires to update the original operating system 21, he can press the trigger key 161 to trigger the input and output port 16. When the embedded system 151 knows the input and output port 16 has triggered, the embedded system 151 requires that the controller 11 executes the boot pointer offset procedure 1111 and/or the original operating system update procedure 1113.

Figure 5:
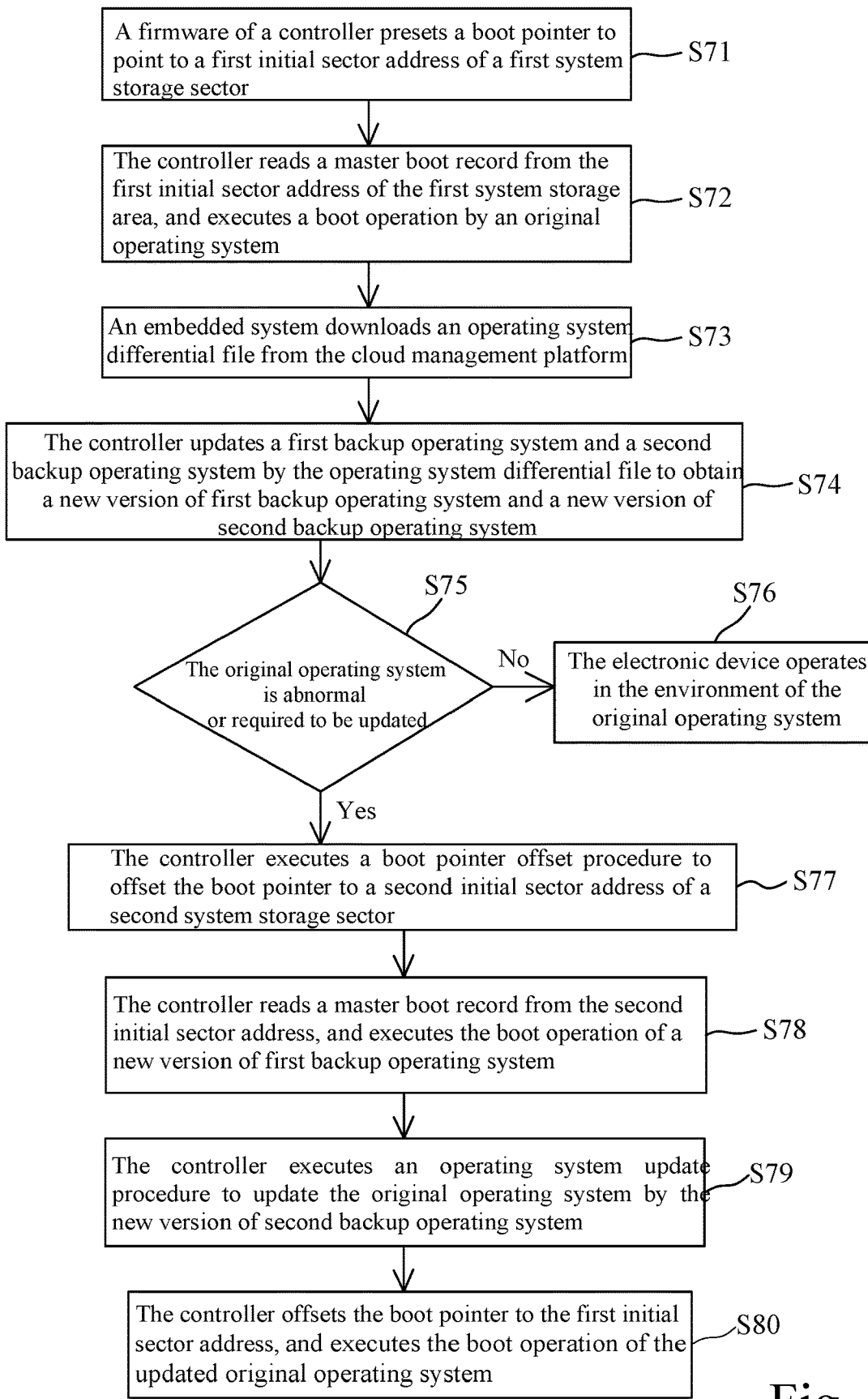
FIG. 5 is a flow chart of a method capable of quickly updating operating system according to one embodiment of the present invention.

Referring to FIG. 5, there is a flow chart of a method capable of quickly updating operating system according to one embodiment of the present invention, with simultaneous reference to FIG. 1 and FIG. 2. As shown in FIGS. 1 and 2, the data storage unit 12 of the data storage device 100 is divided into a first system storage sector 121, a second system storage sector 122, and a data storage sector 125. A state of the first system storage sector 121 and a state of the data storage sector 125 are preset as a displayed state, and a state of second system storage sector 122 is preset as a hidden state. The first system storage sector 121 stores an original operating system 21, and the second system storage sector 122 stores a first backup operating system 22. The first system storage sector 121 comprises a first initial sector address 1211, and the second system storage sector 122 comprises a second initial sector address 1221. The data sector of the first initial sector address 1211 has a master boot record (MBR) 1212, and the data sector of the second initial sector address 1221 has the other master boot record (MBR) 1222.

As shown in FIG. 5, in Step S71, firstly, the firmware 111 of the controller 11 presets a boot pointer 120 to point to the first initial sector address 1211 of the first system storage sector 121. In Step S72, when the electronic apparatus is power on, the controller 11 reads the master boot record 1212 from the first initial sector address 1211, and uses the master boot record 1212 to execute the boot operation of the original operating system 21, such that the electronic apparatus executes the operations in the operating environment of the original operating system 21. In Step S73, the embedded system 151 downloads an operating system differential file 51 from the cloud management platform 300. In Step S74, the controller 11 updates the first backup operating system 22 in the second system storage sector 122 by the operating system differential file 51 so as to obtain a new version of first backup operating system 221.

In Step S75, the embedded system 151 determines whether the original operating system 21 is abnormal or needs to be updated. If the original operating system 21 is normal and does not need to be updated, continuing to perform Step S76, the electronic device continues to execute the operations in the operating environment of the original operating system 21. On the contrary, if the original operating system 21 is abnormal or needs to be updated, continuing to perform Step S77, the controller 11 executes the boot pointer offset procedure 1111 to offset the boot pointer 120 from pointing to the first initial sector address 1211 to pointing to the second initial sector address 1222. In Step S78, the controller 11 reads the master boot record 1222 from the second initial sector address 1221, converts the state of the first system storage sector 121 from the displayed state to the hidden state, and converts the state of the second system storage sector 122 from the hidden state to the displayed state; afterwards, the controller 11 uses the master boot record 1222 to execute the boot operation of the new version of first backup operating system 221, and the electronic apparatus will perform the operations in the operating environment of the new version of first backup operating system 221.

In another embodiment of the present invention, a third system storage sector 123 is further divided from the data sectors of the data storage unit 12 by the controller 11, and third system storage sector 123 stores a second backup operating system 23, as shown in FIG. 4. Returning to Step S74, the controller 11 further updates the second backup operating system 23 in the third system storage sector 123 by the operating system differential file 51 so as to obtain a new version of second backup operating system 231.

In Step S79, during the operation of the new version of first backup operating system 221, the controller 11 executes the operating system update procedure 1113 to read the new version of second backup operating system 231 from the third system storage sector 123, and update the original operating system 21 in the first system storage sector 121 by the new version of second backup operating system 231. In Step S80, when the electronic apparatus starts the next time, the controller 11 executes the boot pointer offset procedure 1111 to offset the boot pointer 120 from pointing to the second initial sector address 1221 back to pointing to the first initial sector address 1211, converts the state of the first system storage sector 121 from the hidden state to the displayed state, converts the state of the second system storage sector 122 from the displayed state to the hidden state, reads the master boot record 1212 from the first initial sector address 1211, and uses the master boot record 1212 to execute the boot operation of the updated original operating system 21 again such that the electronic apparatus will perform the operations in the operating environment of the updated original operating system 21.

Figure 6:
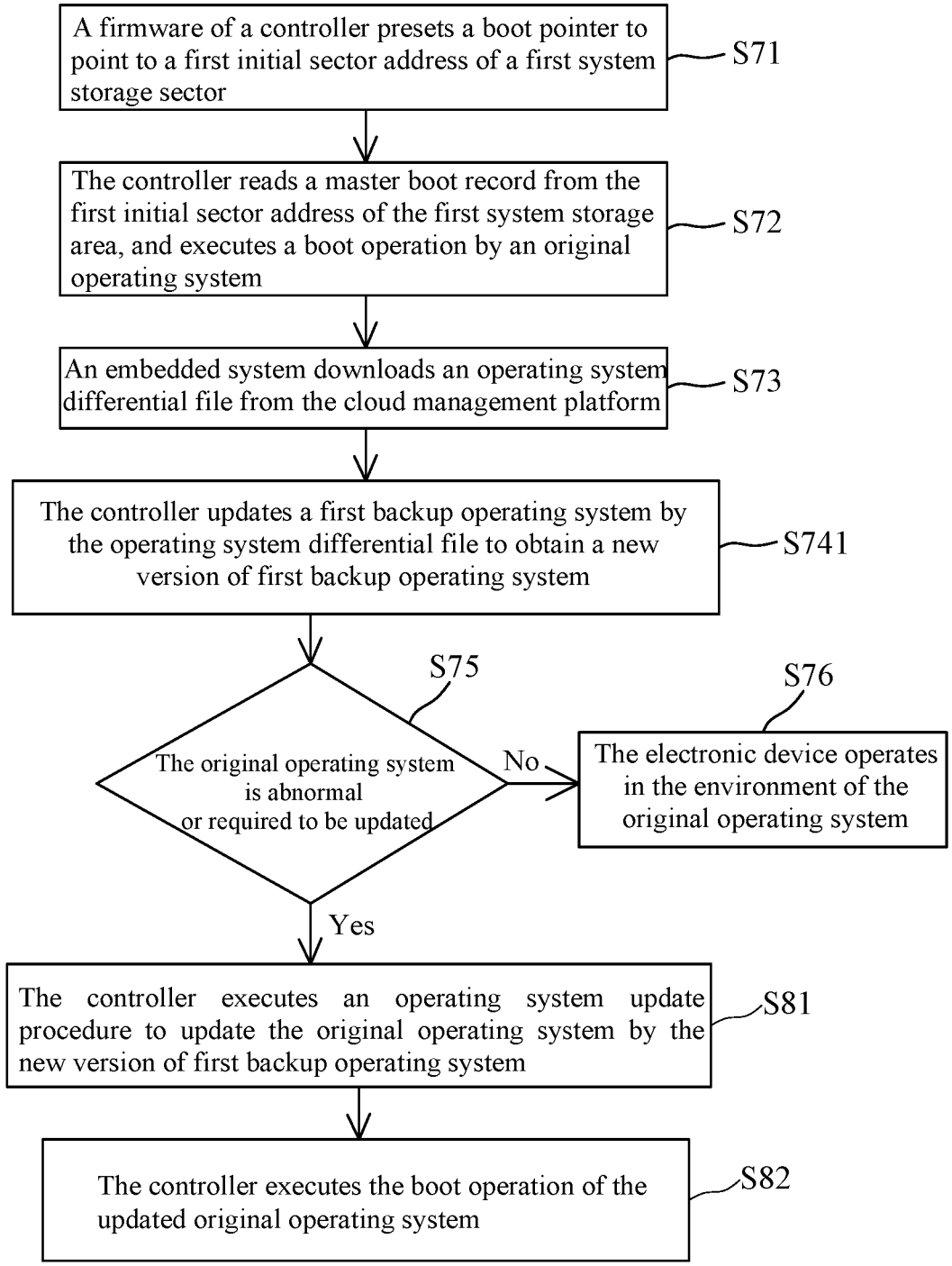
FIG. 6 is a flow chart of a method capable of quickly updating operating system according to another embodiment of the present invention.

Referring to FIG. 6, there is a flow chart of a method capable of quickly updating operating system according to another embodiment of the present invention, with simultaneous reference to FIG. 1 and FIG. 3. In Step S71, firstly, the firmware 111 of the controller 11 presets a boot pointer 120 to point to the first initial sector address 1211 of the first system storage sector 121. In Step S72, when the electronic apparatus is power on, the controller 11 reads the master boot record 1212 from the first initial sector address 1211, and uses the master boot record 1212 to execute the boot operation of the original operating system 21, such that the electronic apparatus executes the operations in the operating environment of the original operating system 21. In Step S73, the embedded system 151 downloads an operating system differential file 51 from the cloud management platform 300. In Step S741, the controller 11 updates the first backup operating system 22 in the second system storage sector 122 by the operating system differential file 51 so as to obtain a new version of first backup operating system 221.

In Step S75, the embedded system 151 determines whether the original operating system 21 is abnormal or needs to be updated. If the original operating system 21 is normal and does not need to be updated, continuing to perform Step S76, the electronic device continues to execute the operations in the operating environment of the original operating system 21. On the contrary, if the original operating system 21 is abnormal or needs to be updated, continuing to perform Step S81, the controller 11 executes an operating system update procedure 1113 so as to update the original operating system 21 in the first system storage sector 121 by the new version of first backup operating system 221 in the second system storage sector 122. In Step S82, finally, the controller 11 executes the boot operation of the updated original operating system 21 again such that the electronic apparatus will perform the operations in the operating environment of the updated original operating system 21.

The above disclosure is only the preferred embodiment of the present invention, and not used for limiting the scope of the present invention. All equivalent variations and modifications on the basis of shapes, structures, features and spirits described in claims of the present invention should be included in the claims of the present invention.

What is claimed is:

1. A data storage device, comprising:
a controller;
a data storage unit, connected to the controller and comprising a first system storage sector and a second system storage sector; wherein the first system storage sector stores an original operating system, and the second system storage sector stores a first backup operating system;
a microprocessor, connected to the controller; and
a network communication unit, connected to the microprocessor, wherein the data storage device is network connected to a cloud management platform via the network communication unit;
wherein when the data storage device downloads an operating system differential file from the cloud management platform via the network communication unit, the microprocessor requires the controller updates the first backup operating system in the second system storage sector by using the operating system differential file, so as to obtain a new version of first backup operating system;
wherein the first system storage sector comprises a first initial sector address, and the second system storage sector comprises a second initial sector address;
wherein the controller comprises a firmware, and the firmware defines a boot pointer offset procedure; a boot pointer is preset by the firmware to point to the first initial sector address of the first system storage sector;
when the original operating system is abnormal or required to be updated, the controller executes the boot pointer offset procedure to offset the boot pointer from pointing to the first initial sector address of the first system storage sector to pointing to the second initial sector address of the second system storage sector, so as to execute a boot operation by the new version of first backup operating system.

2. The data storage device according to claim 1, wherein the operating system differential file is generated by using a computer apparatus to perform a comparison of data difference between a new version of operating system and the original operating system, and to store the operating system differential file into a data storage space of the cloud management platform.

3. The data storage device according to claim 1, wherein the controller comprises a firmware, the firmware defines an original operating system update procedure; when the original operating system is abnormal or required to be updated, the controller executes the original operating system update procedure to update the original operating system in the first system storage sector by the new version of first backup operating system in the second system storage sector, so as to obtain an updated original operating system.

4. The data storage device according to claim 1, wherein a state of the first system storage sector is preset as a displayed state by the firmware, and a state of the second system storage sector is preset as a hidden state by the firmware;
when the boot pointer is offset to point to the second initial sector address of the second system storage sector, the firmware converts the state of the first system storage sector from the displayed state to the hidden state, and converts the state of the second system storage sector from the hidden state to the displayed state.

5. The data storage device according to claim 1, wherein the data storage unit further comprises a third system storage sector, and the third system storage sector stores a second backup operating system;
wherein the controller updates the second backup operating system in the third system storage sector by using the operating system differential file, so as to obtain a new version of second backup operating system;
wherein the firmware defines an original operating system update procedure; during the new version of first backup operating system is operating, the controller executes the original operating system update procedure to update the original operating system in the first system storage sector by the new version of second backup operating system in the third system storage sector.

6. The data storage device according to claim 1, wherein the network communication unit is a WiFi communication interface, an Ethernet communication interface, a 3G, 4G or 5G communication interface, or a communication interface capable of connecting Internet.

7. The data storage device according to claim 1, wherein the microprocessor comprises an embedded system, and the cloud management platform monitors or manages an update operation of operating system via the embedded system.

8. A method capable of quickly updating operating system, comprising:
providing a data storage unit comprising a first system storage sector and a second system storage sector; wherein the first system storage sector stores an original operating system, the second system storage sector stores a first backup operating system;
downloading an operating system differential file from a cloud management platform via a network communication unit;
updating the first backup operating system in the second system storage sector by the operating system differential file to obtain a new version of first backup operating system; and
wherein the first system storage sector comprises a first initial sector address, the second system storage sector comprises a second initial sector address, the method further comprises:
defining a boot pointer offset procedure;
presetting a boot pointer to point to the first initial sector address of the first system storage sector;
executing the boot pointer offset procedure when the original operating system is abnormal to offset the boot pointer from pointing to the first initial sector address of the first system storage sector to pointing to the second initial sector address of the second system storage sector; and
executing a boot operation by the new version of first backup operating system in the second system storage sector.

9. The method according to claim 8, further comprising:
performing a comparison of data difference between a new version of operating system and the original operating system to generate the operating system differential file; and
storing the operating system differential file into a data storage space of the cloud management platform.

10. The method according to claim 8, further comprising defining an original operating system update procedure; when the original operating system is abnormal or required to be updated, executing the original operating system update procedure to update the original operating system in the first system storage sector by the new version of first backup operating system in the second system storage sector.

11. The method according to claim 8, further comprising:
presetting a state of the first system storage sector as a displayed state and presetting a state of the second system storage sector as a hidden state; and
converting the state of the first system storage sector from the displayed state to the hidden state and converting the state of the second system storage sector from the hidden state to the displayed state when the boot pointer is offset to point to the second initial sector address of the second system storage sector.

12. The method according to claim 8, further comprising:
providing a third system storage sector within the data storage unit; wherein the third system storage sector stores a second backup operating system;
updating the second backup operating system in the third system storage sector by the operating system differential file, so as to obtain a new version of second backup operating system;
defining an original operating system update procedure; when the new version of first backup operating system is booted and operating, executing steps of:
updating the original operating system in the first system storage sector by the new version of second backup operating system in the third system storage sector;
executing the boot pointer offset procedure to offset the boot pointer from pointing to the second initial sector address of the second system storage sector back to pointing to the first initial sector address of the first system storage sector after the original operating system in the first system storage sector has updated; and
executing the boot operation again by the updated original operating system in the second system storage sector.

* * * * *